United States Patent
Brunie et al.

(10) Patent No.: US 9,851,977 B2
(45) Date of Patent: Dec. 26, 2017

(54) APPARATUS AND METHOD FOR COMBINING THREAD WARPS WITH COMPATIBLE EXECUTION MASKS FOR SIMULTANEOUS EXECUTION AND INCREASED LANE UTILIZATION

(71) Applicant: KALRAY, Orsay (FR)

(72) Inventors: Nicolas Brunie, Grenoble (FR); Sylvain Collange, Villeurbanne (FR)

(73) Assignee: KALRAY, Orsay (FR)

(*) Notice: Subject to any disclaimer, the term of this patent is extended or adjusted under 35 U.S.C. 154(b) by 812 days.

(21) Appl. No.: 13/707,301

(22) Filed: Dec. 6, 2012

(65) Prior Publication Data
US 2014/0164737 A1  Jun. 12, 2014

(51) Int. Cl.
 *G06F 9/38* (2006.01)
 *G06F 9/30* (2006.01)

(52) U.S. Cl.
 CPC ........ *G06F 9/3851* (2013.01); *G06F 9/30058* (2013.01); *G06F 9/30072* (2013.01); *G06F 9/3887* (2013.01)

(58) Field of Classification Search
 CPC ...... G06F 9/30058; G06F 9/38; G06F 9/3851; G06F 9/3885; G06F 9/3887
 See application file for complete search history.

(56) References Cited

U.S. PATENT DOCUMENTS

| | | | |
|---|---|---|---|
| 2002/0144083 A1* | 10/2002 | Wang | G06F 9/30072 712/23 |
| 2007/0288731 A1* | 12/2007 | Bradford | G06F 9/30072 712/235 |
| 2011/0219221 A1* | 9/2011 | Skadron et al. | 712/235 |
| 2012/0198425 A1* | 8/2012 | Eichenberger et al. | 717/140 |
| 2014/0122836 A1* | 5/2014 | Gschwind | G06F 9/3017 712/205 |

OTHER PUBLICATIONS

Meng et al., "Dynamic Warp Subdivision for Integrated Branch and Memory Divergence Tolerance", 2010, 12 pages.*
Meng et al., "Leveraging Memory Level Parallelism Using Dynamic Warp Subdivision", Apr. 2009, pp. 1-11.*
(Continued)

*Primary Examiner* — David J Huisman
(74) *Attorney, Agent, or Firm* — Oliff PLC (57) ABSTRACT

A method for executing instructions on a single-program, multiple-data processor system having a fixed number of execution lanes, including: scheduling a primary instruction for execution with a first wave of multiple data; assigning the first wave to a corresponding primary subset of the execution lanes; scheduling a secondary instruction having a second wave of multiple data, such that the second wave fits in lanes that are unused by the primary subset of lanes; assigning the second wave to a corresponding secondary subset of the lanes; fetching the primary and secondary instructions; configuring the execution lanes such that the primary subset is responsive to the primary instruction and the secondary subset is simultaneously responsive to the secondary instruction; and simultaneously executing the primary and secondary instructions in the execution lanes.

6 Claims, 3 Drawing Sheets

(56) References Cited

OTHER PUBLICATIONS

Fung et al., "Dynamic Warp Formation and Scheduling for Efficient GPU Control Flow", 2007, pp. 407-418.*
Fung et al., "Thread Block Compaction for Efficient SIMT Control Flow", 2011, pp. 25-36.*
Narasiman et al., "Improving GPU Performance via Large Warps and Two-Level Warp Scheduling", Dec. 2010, pp. 1-24.*
Lee et al., "Debunking the 100X GPU vs. CPU Myth: An Evaluation of Throughput Computing on CPU and GPU," *ISCA*, Jun. 19-23, 2010, pp. 451-460, Saint-Malo, France.
Fung et al., "Dynamic Warp Formation: Efficient MIMD Control Flow on SIMD Graphics Hardware," *ACM Transactions on Architecture and Code Optimization*, Jun. 2009, pp. 7:1-7:37, vol. 6, No. 2.
Dasika et al., "PEPSC: A Power-Efficient Processor for Scientific Computing," *PACT*, 2011, all 10 pages.
Brunie et al., "Simultaneous Branch and Warp Interweaving for Sustained GPU Performance," *$39^{th}$ Annual International Symposium on Computer Architecture*, 2011, pp. 1-12, Portland, OR.
Diamos et al., "SIMD RE-Convergence at Thread Frontiers," *Micro '11*, Dec. 3-7, 2011, Porto Alegre, Brazil, all 12 pages.

\* cited by examiner

APPARATUS AND METHOD FOR COMBINING THREAD WARPS WITH COMPATIBLE EXECUTION MASKS FOR SIMULTANEOUS EXECUTION AND INCREASED LANE UTILIZATION

FIELD OF THE INVENTION

The invention relates to single-instruction, multiple-data (SIMD) processors, such as graphics processing units (GPU), which, from a programmer's stand point, can also be considered as single-program, multiple-data (SPMD) or single-instruction, multiple-thread (SIMT) processors.

BACKGROUND OF THE INVENTION

In the graphics processing domain, many tasks involve applying a same algorithm to multiple pixels, such as an image line or a macroblock. Therefore graphics processors were originally designed to apply a single instruction to multiple pixels at the same time in order to increase throughput. Such graphics processors thus include multiple hardware execution units, generally pipelined, where a single instruction is applied simultaneously to the data present in each execution unit.

A same execution unit is usually assigned to a same program thread and the multiple threads processed in parallel lockstep in the execution units are sometimes referred to as a "warp". The data at the same state of processing in the units will be referred to as a data "wave".

Such architectures have proven successful in general-purpose parallel computing, in particular because of their ability to manage tens of warps and to switch warps at each cycle. However, they only benefit applications whose control flow patterns and memory access patterns present enough regularity. Prior work has shown that the performance potential of GPU architectures is vastly underutilized by many irregular applications, for example:

V. W. Lee, C. Kim, J. Chhugani, M. Deisher, D. Kim, A. D. Nguyen, N. Satish, M. Smelyanskiy, S. Chennupaty, P. Hammarlund, R. Singhal, and P. Dubey. Debunking the 100× GPU vs. CPU myth: an evaluation of throughput computing on CPU and GPU. In ISCA '10: Proceedings of the 37th annual international symposium on Computer architecture, pages 451-460, 2010, W. W. L. Fung, I. Sham, G. Yuan, and T. M. Aamodt. Dynamic warp formation: Efficient MIMD control flow on SIMD graphics hardware. ACM Trans. Archit. Code Optim., 6:7:1-7:37, July 2009, and G. Dasika, A. Sethia, T. Mudge, and S. Mahlke. PEPSC: A power-efficient processor for scientific computing. In PACT, 2011.

SUMMARY OF THE INVENTION

There is thus a need for optimizing the efficiency of an SPMD or SIMD processor when running applications that have irregular properties, in particular irregular control flow and memory access patterns.

In order to address this need, there is provided a method for executing instructions on a single-program, multiple-data processor system having a fixed number of execution lanes, comprising:
scheduling a primary instruction for execution with a first wave of multiple data;
assigning the first wave to a corresponding primary subset of the execution lanes;
scheduling a secondary instruction having a second wave of multiple data, such that the second wave fits in lanes that are unused by the primary subset of lanes;
assigning the second wave to a corresponding secondary subset of the lanes;
fetching the primary and secondary instructions;
configuring the execution lanes such that the primary subset is responsive to the primary instruction and the secondary subset is simultaneously responsive to the secondary instruction; and
simultaneously executing the primary and secondary instructions in the execution lanes.

According to an embodiment, the method comprises:
scheduling a conditional branch instruction;
assigning the lanes where the branch instruction causes execution to proceed in a first branch to the primary subset;
identifying the primary instruction as an instruction of the first branch;
assigning the lanes where the branch instruction causes execution to proceed in a second branch to the secondary subset; and
identifying the secondary instruction as an instruction of the second branch.

According to an embodiment, the method comprises:
executing instructions of the two branches simultaneously in their respective subsets of lanes;
scheduling a branch convergence instruction in a first of the subsets of lanes;
comparing the address of the convergence instruction to the address of an instruction scheduled in the other subset of lanes;
stalling the convergence instruction while its address is greater than the address of the instruction scheduled in the other subset of lanes, whereby the first subset of lanes becomes free for scheduling an alternate instruction; and
executing the convergence instruction when its address is equal to the address of the instruction scheduled in the other subset of lanes.

According to an embodiment, the convergence instruction is a specific instruction inserted at compile time at the convergence address of the branches of the branch instruction, wherein the convergence instruction is designed to cause a hardware unit to carry out the compare and stall steps.

According to an embodiment, the method comprises:
maintaining a warp pool, wherein each warp includes the current state of a wave of multiple data being processed, an execution mask identifying the subset of execution lanes used for the wave, and the next instruction to execute on the wave;
comparing the execution mask of the primary instruction to the execution masks stored in the warp pool; and
fetching the secondary instruction in the warp pool if the execution mask of the secondary instruction is compatible with the complement of the execution mask of the primary instruction.

A processor system is also provided, comprising an instruction memory; a primary instruction fetch unit configured to fetch a primary instruction from the instruction memory; a secondary instruction fetch unit configured to fetch a secondary instruction from the instruction memory; a plurality of execution lanes configured to execute the primary instruction in parallel on a wave of multiple data assigned to a primary subset of the lanes, and to simultaneously execute the secondary instruction in parallel on a wave of multiple data assigned to a secondary subset of the lanes; and decision circuitry configured to schedule execution of the primary instruction and identify the primary subset of lanes, and to schedule execution of the secondary instruction based on the secondary subset not intersecting the primary subset.

According to an embodiment, the decision circuitry comprises a functional unit configured to execute a branch instruction in parallel in multiple execution lanes, and identify a first instruction in lanes where execution continues in a first branch, and a second instruction in lanes where execution continues in a second branch; and a scheduler configured to identify the primary and secondary instructions respectively as the first and second instructions, and identify the lanes of the first and second branches respectively as the primary and secondary subsets of lanes.

According to an embodiment, the decision circuitry comprises a warp pool wherein each warp includes the current state of a wave of multiple data being processed, an execution mask identifying the subset of execution lanes used for the wave, and the next instruction to execute on the wave. A content addressable memory stores the execution masks of the warp pool; and a scheduler is configured to schedule the secondary instruction from the warp pool by using the complement of the primary instruction's execution mask as an input to the content addressable memory, wherein the content addressable memory is designed to identify a match when only the "0s" of the complement of the primary instruction execution mask match a mask stored in the content addressable memory.

DETAILED DESCRIPTION OF THE PREFERRED EMBODIMENTS

Figure 1:
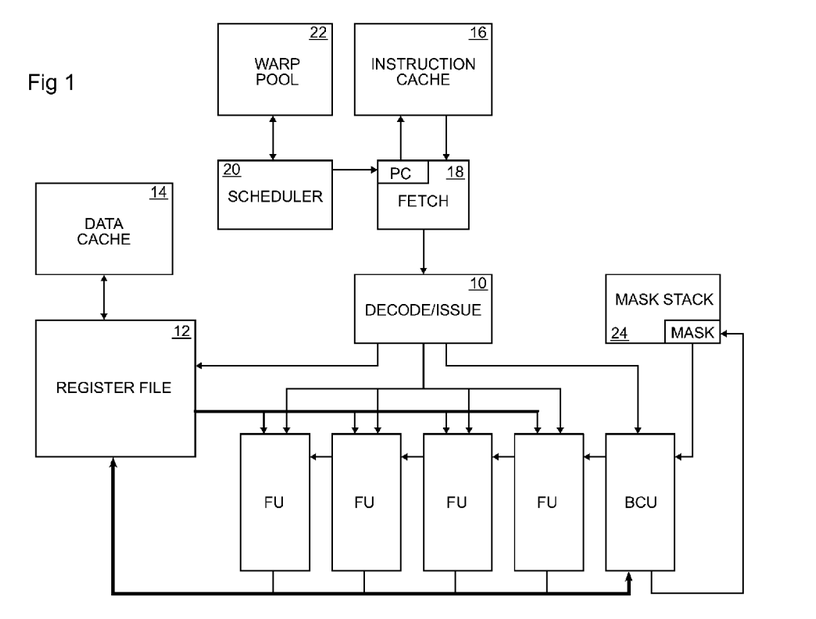
FIG. 1 is a block diagram of an exemplary SPMD processor system.

FIG. 1 is a block diagram of an exemplary single-program, multiple-data processor system. It comprises a plurality of functional units FU to which a same instruction is broadcast by an instruction decode and issue unit 10. Moreover the functional units receive independent data, or a data wave, to operate on from a register file 12. The register file exchanges its data with a data memory location, usually a data cache memory 14. The data wave location in the register file is identified by the decode unit 10 from information carried in the instruction. The results produced by the functional units are written back in the register file, and, from there, into the data cache, if necessary.

The instructions to execute are contained in an instruction memory location, usually an instruction cache memory 16. An instruction fetch unit 18 is configured to transfer an instruction identified by a program counter PC from the instruction cache to the decode unit 10. The instruction path is thus pipelined, i.e. several clock cycles will occur, typically in the order of ten, between the time an instruction is fetched by unit 18 and the time the corresponding result is produced by the functional units FU.

A scheduler 20 is configured to select the sequence of instructions to execute by correspondingly updating the program counter PC. These instructions are retrieved from a warp pool 22, containing a snapshot of the execution state of a group of executable warps. In particular, the pool contains, for each warp, the program counter value of the next instruction to execute in the warp, an identification of the data wave to execute the instruction with, and an execution mask identifying the functional units that are to be used (indeed, as explained later, all functional units are not always used). The execution mask is placed in a mask stack 24 and is broadcast to all functional units when unit 10 broadcasts the corresponding instruction. The functional units identified by bits set to an active state in the mask will respond to the instruction, while the remaining units will stay idle.

For sake of simplification, each functional unit FU is shown as independent. Each such functional unit would equate to an ALU or an FPU of a general-purpose processor. In practice, in order to save area at the expense of acceptable latency, certain more complex operators, such as divide or elementary function computation, are shared among several functional units. In order to avoid ambiguity in the following description as to whether the hardware of a functional unit is independent or shared among several functional units, the independent units FU as shown will rather be referred to as "execution lanes". Thus, data applied at the input of an execution lane will always remain in the same lane during processing, even if that lane may merge at some point with another lane in a shared operator, to diverge again when the result is written back in the register file.

Although only four execution lanes FU are shown, a typical GPU may have several tens of lanes.

The GPU usually includes a Branch and Control Unit BCU for managing branch instructions. When unit 10 decodes a branch instruction, it issues a specific code to unit BCU. For conditional branches it also broadcasts a test operation to all units FU, usually a comparison. The results of the test operations output by units FU are fed-back to unit BCU, which will accordingly modify the masks to apply for the next instructions in the mask stack 24.

When a processor like that of FIG. 1 is used for general-purpose parallel computing, the programs run on the processor tend to have significantly more irregular properties than standard graphics processing applications, which reduces the fill factor of the execution lanes, thus the efficiency.

A typical situation where the lane fill factor will diminish is upon running control flow instructions. Consider the following exemplary pseudo-code:

| PC | Instruction |
|---|---|
| 0 | // warp |
| 1 | if (Tid IS EVEN) { |
| 2 | // branch 0 |
| 3 | if (Tid ≥ 2) { |
| 4 | // branch 0.0 |
|  | } else { |
| 5 | // branch 0.1 |
|  | } |

| PC | Instruction |
|---|---|
| 6 | // converge |
|   | } else { |
| 7 | // branch 1 |
|   | { |
| 8 | // converge |

The above piece of pseudo-code is to be executed simultaneously in all execution lanes of the processor, i.e. four lanes in the example of FIG. 1. "PC" denotes the program counter value, i.e. the sequence number of the corresponding instruction, symbol "//" introduces a comment and denotes an arbitrary instruction or sequence of instructions that can be executed at the corresponding location, and Tid is a parameter identifying the thread on which the code is executed, a unique identifier in the warp pool, which may here be considered as the lane identifier.

The instruction at PC=1 is a conditional branch instruction testing the parity of the thread identifier Tid. If Tid is even, execution continues in a first branch at PC=2, else it continues in a second branch at PC=7. Both branches converge at PC=8. Within the first branch, there is another conditional branch instruction at PC=3, testing whether Tid≥2. If the test is true, execution continues in a first sub-branch at PC=4, else it continues in a second sub-branch at PC=5. Both sub-branches converge at PC=6.

It is thus obvious that, depending on the outcome of each test, the same instruction will not be applicable in all execution lanes. In such a case, the branches are executed in sequence and, while one branch is executed, the execution lanes where that branch does not apply are disabled. The following drawings show this in more detail.

Figures 2A, 2B:
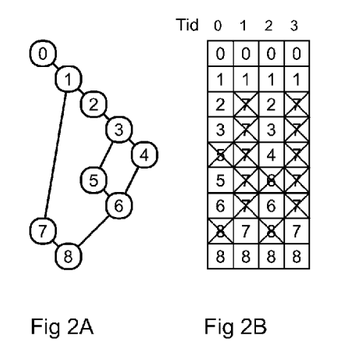
FIGS. 2A to 2C are graphs illustrating an exemplary manner of handling branches occurring in multiple threads of a warp processed by the system of FIG. 1.

FIG. 2A is a flow graph showing a possible sequential execution of all the instructions of the exemplary pseudo-code. The PC values are shown in circles. These values indicate the positions of the instructions in the linearized compiled binary as decided by the compiler. The vertical position of a circle is indicative of the clock cycle at which the corresponding instruction is executed. In this case, for sake of simplicity, execution time and position correspond. Generally however, the time at which an instruction is executed can be different from the order determined by the compiler.

FIG. 2B illustrates the PC values of the instructions being fetched for each execution lane, in correspondence with the graph of FIG. 2A. The time goes from top to bottom, each line indicating a synchronous step.

Figure 2C:
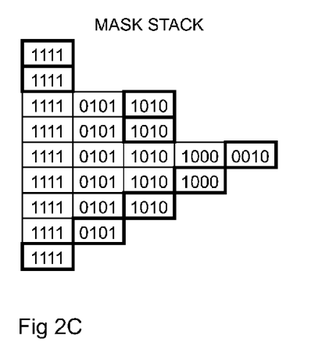

FIG. 2C illustrates the contents of the mask stack 24. The active execution mask for each clock cycle, shown in a bold frame, is the last mask pushed on the stack.

As shown in FIG. 2B, the two first instructions, for PC=-0 and 1, are applied to all four lanes. The execution mask is 1111.

After instruction 1, instruction 2 is only applicable to the even lanes, whereas instruction 7 is applicable to the odd lanes. The scheduler decides to first execute the first branch, i.e. fetch instruction 2 and leave instruction 7 for later. This means that a warp that initially occupied all lanes is temporarily reduced to occupy only the lanes with which the first branch is executed. Masks 0101 (for instruction 7) and 1010 (for instruction 2) are determined by the branch unit BCU and successively pushed onto the stack, whereby mask 1010 becomes the active mask.

The masks may be determined from the results of the test in the branch instruction 1. The active mask is crafted from the mask of instruction 1 such that it has a "1" for every lane where the test yields "true" and a "0" for every lane where the test yields "false". The second mask is crafted from the mask of instruction 1 such that it has a "0" for every lane where the test yields "true" and a "1" for every lane where the test yields "false". In the example, the second mask is complementary to the active mask. In situations where the branch instruction (like instruction 3) is run in less than all lanes, the masks will not be strictly complementary.

The active mask causes instruction 2 to be applied to lanes 0 and 2, and causes lanes 1 and 3 to remain unresponsive, i.e. instruction 7, shown as crossed-out in these lanes, is not fetched and remains pending.

The same mask 1010 is applied with instruction 3. Instruction 3 creates two sub-branches in lanes 0 and 2. The scheduler decides to first execute the first sub-branch, i.e. fetch instruction 4 and leave instruction 5 for later. Masks 1000 (for instruction 5) and 0010 (for instruction 4) are pushed onto the stack, above mask 1010, whereby mask 0010 becomes active. Instruction 4 is thus applied only to lane 2, while lane 0, awaiting instruction 5, and lanes 1 and 3, awaiting instruction 7, remain unresponsive.

After execution of instruction 4 in lane 2, mask 0010 is removed from the stack, whereby mask 1000 becomes active. Instruction 5 is applied to lane 0, while lanes 1, 2 and 3 remain unresponsive, awaiting instructions 7, 6, and 7. Instruction 5 has in the meantime been fetched.

After execution of instruction 5 in lane 0, mask 1000 is removed from the stack, whereby mask 1010 becomes active. Instruction 6 is applied to lanes 0 and 2, while lanes 1 and 3 remain unresponsive, awaiting instruction 7.

After execution of instruction 6 in lanes 0 and 2, mask 1010 is removed from the stack, whereby mask 0101 becomes active with instruction 7, while lanes 0 and 2 remain unresponsive, awaiting instruction 8.

Finally, after execution of instruction 7 in lanes 1 and 3, mask 0101 is removed from the stack, whereby the initial mask 1111 becomes active with instruction 8 that is applied to all four lanes.

The above pseudo-code example, illustrative of an irregular execution pattern, thus shows that, depending on the occurrence of conditional branches, the utilization of the lanes can be reduced to a single lane. In the example, the utilization factor is 20/36=0.56, and 9 cycles are required to execute the code, amounting to 20/9=2.22 instructions per cycle.

The inventors discuss a processor architecture that improves the lane utilization factor in an article titled "Simultaneous Branch and Warp Interweaving for Sustained GPU Performance", a first version of which was published Dec. 7, 2011. This article is incorporated herein by reference.

The processor architecture is designed such that it can execute a second instruction simultaneously with a first instruction, in lanes that are inactive for the first instruction. In other words, every time a first, or primary instruction is scheduled to execute in less than all available lanes, the scheduler attempts to find a secondary instruction that can be executed in the lanes left idle by the primary instruction. Such primary and secondary instructions are immediately identifiable upon execution of a control flow instruction, usually having two alternative branches: the primary instruction is fetched from a first branch, whereas the secondary instruction is fetched from the second branch. This alternative is designated as "Simultaneous Branch Interweaving"

(SBI). The secondary instruction may also be any available instruction awaiting execution in the warp pool. This alternative is designated as "Simultaneous Warp Interweaving" (SWI).

Figure 3:
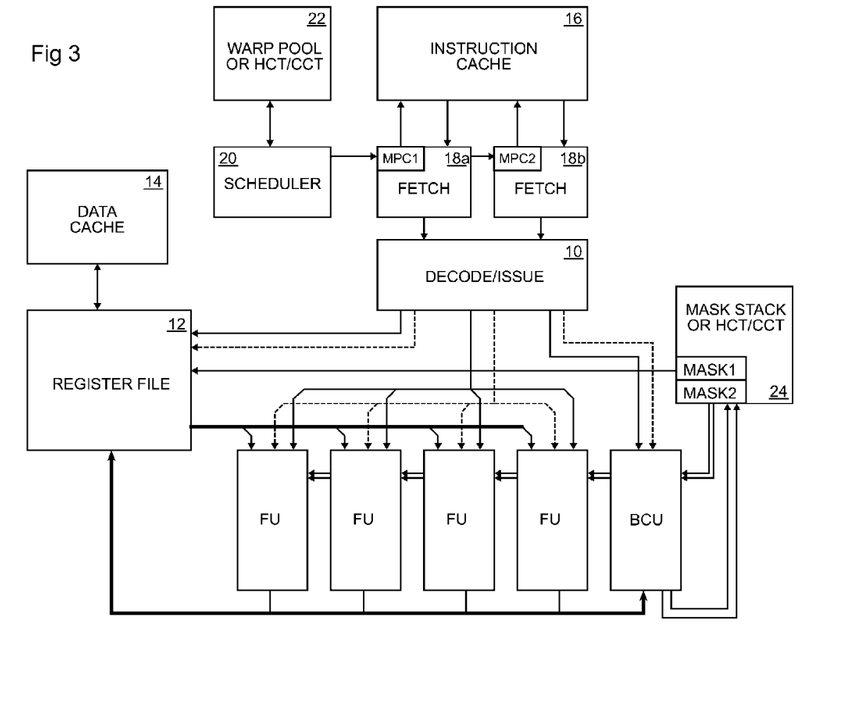
FIG. 3 is a block diagram of an embodiment of an N-instruction, multiple-data processor system, exemplified as a two-instruction, multiple-data processor system.

FIG. 3 is a block diagram of an embodiment of an N-instruction, multiple-data (NIMD) processor system according to the teachings of the above article. It is exemplified as a two-instruction, multiple-data processor system (2-IMD). Same elements as those of FIG. 1 are designated by same references, and will not be described again.

The processor system of FIG. 3 differs from that of FIG. 1 in that it comprises two instruction fetch units 18a and 18b, designed to fetch two independent instructions from instruction cache 16. The instructions to fetch are identified by respective program counters MPC1 and MPC2, set by the scheduler 20.

In order to fetch two independent instructions simultaneously, instruction cache 16 may be a dual read port memory. The decode and issue unit 10 may then be designed to decode both instructions and broadcast them simultaneously to the execution lanes FU, as shown by a solid line for the first instruction, and a dashed line for the second instruction. In addition, the decode unit identifies the data for both instructions in the register file 12, as also shown by a solid line and a dashed line.

When an instruction, typically a branch instruction, causes threads in a warp to lose synchronization, the warp is split into multiple sub-warps, most often two sub-warps. Each sub-warp contains threads that stay in lockstep. Sub-warps within a particular warp are uniquely identified by respective program counters (MPC1 and MPC2 for the first two) and execution masks (MASK1 and MASK2 for the first two). In the NIMD architecture of FIG. 3, multiple sub-warps may be active simultaneously.

The execution masks MASK1, MASK2 may be stacked separately in mask stack 24. Each mask identifies the lanes to be used by the corresponding instruction. When all lanes are used, the two masks are complementary, i.e. MASK1 identifies a subset of the lanes (possibly all lanes), while MASK2 identifies the remaining lanes. In a situation where some lanes are not used, the second mask identifies only some of the remaining lanes, and lanes that are identified by neither mask remain unused. In other words, the two masks identify two respective subsets that do not intersect.

Both masks MASK1 and MASK2 are provided to all execution lanes. Each execution lane is responsive to a respective bit or flag in both masks. Only one of those flags may be active at a time to satisfy the complementarity conditions mentioned above. When a flag is active, say in MASK1, the lane is responsive to the instruction corresponding to MASK1 (solid line from decode unit 10). When the other flag is active, the lane is responsive to the instruction corresponding to MASK2 (dashed line from decode unit 10). When none of the flags is active, the lane remains idle.

In order to select the data needed for both instructions, one of the masks, for instance MASK1, is provided to control circuitry of register file 12. The active flags of MASK1 identify the lanes where the register file places the data for the primary instruction, which data is selected by the first address provided by decode unit 10 (solid line). The register file places the data selected by the second address (dashed line) in the remaining lanes, corresponding to the inactive flags of MASK. The expected data is thus provided to the lanes responsive to the secondary instruction. Data also happens to be provided to lanes that may be idle, but that data is then ignored. In fact, providing data to the idle lanes could cause additional power consumption due to the signal transitions resulting on the data lines. To avoid this consumption, the control circuitry may use MASK2 in a similar manner as MASK1.

The branch unit BCU is designed to handle multiple branch instructions simultaneously, two in this example—it is therefore designed to receive two codes from the decode unit 10, and modify two sets of masks in the mask stack 24, depending on the test results provided by the units FU and the current values of masks MASK1 and MASK2.

If circuit 24 were configured to handle the execution masks via a stack system, a separate stack would be needed for each warp in the warp pool 22 in order to ensure immediate warp context switching.

To avoid such burden, an alternative structure to circuit 24 is provided that also implements the warp pool 22 and the program counters MPC1, MPC2. This structure includes two context tables designated "Hot Context Table", or HCT, and "Cold Context Table", or CCT. The HCT has one row for each warp in the warp pool, indexed by a warp identifier, and each row has a number of entries equal to the number of instructions that the processor can execute in parallel. In the present example, each warp thus has a pair of entries in the HCT. Each entry of the HCT stores the current PC value (MPC1, MPC2) of the corresponding warp or sub-warp, and the current execution mask of the warp or sub-warp. Each entry of the HCT also stores, where necessary, a pointer to an entry in the CCT.

The CCT is common to all warps of the warp pool and it is configured to store linked lists of stalled sub-warps. Each entry of the CCT stores the PC value of the stalled instruction, the execution mask of the instruction, and a pointer to a next entry of the list.

When the scheduler 20 decides to switch contexts, i.e. start or continue execution of a new warp, it provides the warp identifier as an index to the HCT. The index selects the corresponding pair of entries of the HCT. The PC and mask values of the selected, or active HCT entries become the values directly used in circuits 18a/b and 24.

Figure 4A:
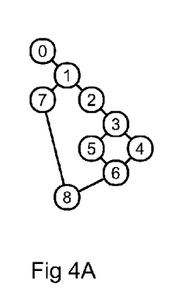
FIGS. 4A to 4C are graphs illustrating how processing of the branches of FIGS. 2A and 2B may be optimized in the system of FIG. 3.
Figure 4B:
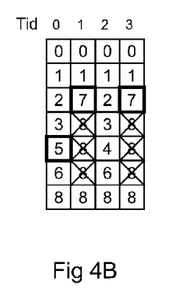
Figure 4C:
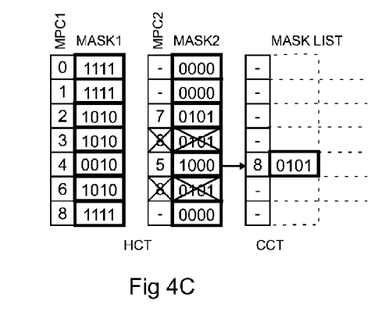

FIGS. 4A to 4C are graphs illustrating how the exemplary pseudo-code detailed above may be processed in the processor system of FIG. 3, using the context table structure. This pseudo-code would represent one warp in the warp pool. FIGS. 4A and 4B are analogous to FIGS. 2A and 2B, while FIG. 4C illustrates the use of the hot and cold context tables HCT and CCT in more detail.

FIG. 4A shows that instructions 2 and 7 may be executed in parallel. This also stands for instructions 4 and 5. The number of cycles needed to execute the fill piece of pseudo-code falls from 9 to 7. This is explained in more detail below.

In FIG. 4B, instructions 0 and 1 are successively executed in all lanes. The mask pair for each is (1111, 0000), meaning that there is no secondary instruction. Such a mask combination is in fact the initial value for a warp and indicates that the warp is not split in sub-warps.

At each cycle, the scheduler 20, or a branch unit that may be considered as part of the scheduler, updates the PC values (MPC1, MPC2) in the active entries of the HCT. The scheduler also determines and updates the mask values, where necessary.

After conditional branch instruction 1, instruction 2 is applicable to the even lanes, whereas instruction 7 is applicable to the odd lanes. According to the simultaneous branch interweaving technique (SBI), both instructions are fetched, whereby the warp is split into two sub-warps. The scheduler assigns mask 1010 to instruction 2, of the primary sub-warp, and mask 0101 to instruction 7, of the secondary sub-warp, and updates the masks in the active HCT entries (MASK1, MASK2).

Like in FIG. 2B, the scheduler updates the PC of the primary instruction, here MPC1, with address 2. The scheduler simultaneously updates the PC of the secondary instruction, MPC2, with address 7. Thus, in the next cycles, instructions 2 and 7 are simultaneously executed in the lanes identified by their respective masks MASK1, MASK2, directly read from the active HCT entries.

Branch instruction 3 is scheduled next to execute in lanes 0 and 2. Lanes 1 and 3 could receive instruction 8 for execution in parallel with instruction 3. This is however not desirable, because instruction 8, and the instructions coming after it, would be fetched once here for execution in lanes 1 and 3, and a second time later for execution in lanes 0 and 2. This would entail fetching and executing twice each instruction having a PC value greater than 8, which would in particular increase the instruction cache traffic. It is therefore preferable to stall the execution of instruction 8, as shown, until it can be executed in all lanes. The execution of instruction 8 is stalled by a convergence mechanism detailed below: lanes 1 and 3 wait for lanes 0 and 2 to reach PC=8.

After branch instruction 3, instruction 4 is scheduled as a primary instruction in lane 2, with a mask 0010. It is not time yet to fetch instruction 8, which could be scheduled in lanes 1 and 2 as the secondary instruction. Instead, instruction 5 is scheduled in lane 0 as the secondary instruction, with a mask 1000. Mask 1000 is written in the second entry (MASK2) of the HCT—this entry however contains mask 0101 for instruction 8 that is awaiting execution. In this situation, the former content (8, 0101) of the HCT entry is evicted into the CCT, as shown, and the new mask 1000 is written in the HCT together with a pointer to content (8, 0101) in the CCT.

There are now three sub-warps, among which only two can be executed simultaneously. In some situations, there could be more than three sub-warps, for instance if each sub-warp splits into to two new sub-warps. In that case, the CCT row would contain multiple PC-mask pairs, each being pointed at, either by the content of one of the HCT entries, or by a more recent pair entered in the CCT row, thus creating a linked list of PC-mask pairs.

In the next cycle, instructions 4 and 5 are simultaneously sent for execution in lanes 2 and 0 identified by their respective masks read from the active HCT entries.

Instruction 6 is next scheduled as the primary instruction in the first active entry of the HCT, with a mask 1010 identifying lanes 0 and 2. The second entry of the HCT is prioritarily updated with the content of the CCT, if any, pointed at by the current content of the second HCT entry— the value pair (8, 0101) is moved back into the HCT. However, it is not time yet for instruction 8 to be scheduled, and its execution is still stalled.

After instruction 6, it is finally time to schedule instruction 8. Instruction 8 becomes the primary instruction, scheduled for all four lanes. At this convergence point, instruction address 8 is set in counter MPC1, counter MPC2 is cleared and MASK1 and MASK2 are merged into the new MASK1.

The lane utilization factor obtained with this structure is thus 20/28=0.71, and only 7 cycles are required instead of 9 to execute the code, which amounts to 20/7=2.86 instructions per cycle.

In order to identify that it is too early to schedule an instruction (instruction 8 in the above example), the following procedure may be used, based on the execution of special instructions inserted by the compiler at the convergence addresses (6 and 8), denoted by "converge" in the above pseudo-code example.

Instruction 1, which can be seen as a conditional branch, will be executed by the BCU. The BCU is in charge of dividing the execution mask 1111 between 1010 for the "if" branch and 0101 for the "else" branch. These masks are written in the HCT table with the associated PC values 2 and 7.

At the next cycle, the two instructions 2 and 7 are issued simultaneously with masks 1010 and 0101 respectively for execution. Execution of instruction 2 is straightforward and leads to a PC increment to 3 in MPC1. Similarly, execution of instruction 7 leads to a PC increment to 8 in MPC2.

At the fourth cycle, the next instruction (PC=3), another branch instruction, is issued with mask 1010, and a convergence instruction at PC=8 is issued with mask 0101. Instruction 8, a specific instruction inserted by the compiler, points to the original branch divergence address, PC=1. The compiler may embed the value PC=1 as a payload of the instruction. The BCU is in charge of checking if the current values in the HCT are in an interval [1, 8[ defined by the convergence instruction payload and the current PC value. The "open bracket" notation is provided herein in accordance with ISO 31-11. For example, [1, 8[ includes 1 (closed bracket) but excludes 8 (open bracket). This happens to be the case in the fourth cycle: threads 0 and 2 have PC=3, whereby the execution of convergence instruction 8 is stalled. By "stalling" instruction 8, it is meant that the instruction remains idle in the background and does not cause an increment of the PC.

Thus stalling instruction 8 can be realized in various ways, for instance by pushing PC=8 and mask 0101 into a convergence waiting list of the BCU or by indicating with an extra bit in the HCT/CCT tables that the entry associated to PC=8 is idle.

Another solution doesn't entail adding extra information: instruction 8 is kept scheduled for the next cycles, i.e., PC increment is made until its execution can complete. Thus, at each following cycle, the BCU reacts to instruction 8 by checking whether the current values in the HCT are in the interval [1, 8[. If yes, the execution of instruction 8 is stalled until the next cycle.

At the fifth cycle, instruction 4 is executed with mask 0010 (PC updated to 6) and instruction 5 is executed with mask 1000, also leading to a PC update to 6. Instruction 8 is still scheduled, but since it can't complete yet, it has temporarily been replaced by instruction 5 and relegated to the CCT table.

In the sixth cycle, instruction 6 is executed with mask 1010. Instruction 6 is also a convergence instruction, defining an interval [3,6[—it can complete immediately, because the HCT doesn't contain values in interval [3,6[. Indeed, the HCT contains values 6 and 8. Instruction 6 is executed and the corresponding PC value is updated to 8.

It is important to note that instruction 6 could have two distinct masks before execution: mask 0010 originating from the execution of instruction 4 and mask 1000 originating from the execution of instruction 5. Thus, two instances of instruction 6 could be executed respectively with masks 0010 and 1000, which is equivalent to executing a single instance of instruction 6 with mask 1010. It is preferable to execute a single instance of instruction 6, so that a distinct instruction can be executed simultaneously in the free lanes (here instruction 8, that cannot complete yet).

The BCU is in charge of merging the masks of multiple instances of a same convergence instruction, for instance before the convergence instruction (6) is fetched. When instructions 4 and 5 are executed and their results are committed in the register file 12, their masks and PC values are updated in the warp pool (HCT/CCT). An update unit may be provided that merges the masks when it detects that the corresponding PC values are equal between existing entries in the warp pool and committed inputs.

Instruction 8 can finally be completed in the seventh cycle, since all threads then have the same PC value of 8, outside the convergence interval [1,8[. There is only one entry in HCT: instruction 8, with mask 1111. Instruction 8 is executed by the BCU and the PC value is updated to 9.

The above mentioned intervals ([1,8[ and [3,6[), used for determining when the convergence instruction should be stalled, have been described with a simplified example that happens to require only the upper bound. The general purpose of such an interval is to define the possible address values of a thread subset that will converge at the currently scheduled converge instruction, and thus avoid stalling the converge instruction when the HCT contains no addresses in the interval, also in the event when the HCT contains addresses that are smaller than the lower bound.

The lower bound can be chosen to be the divergence point (i.e. the address of the branch instruction), because one can demonstrate that every thread which reaches the convergence point has passed through the divergence point (see, e.g. "SIMD Re-Convergence At Thread Frontiers", Gregory Diamos et al, MICRO'44 Proceedings of the Annual IEEE/ACM International Symposium on Microarchitecture, pages 477-488).

It is even possible to assume that the execution of the threads was synchronous at the divergence point (because the described converge instruction mechanism ensures the lockstep execution of every possible code block).

In the case of multiple branch levels, this mechanism allows the execution of nested branches even if threads are stalled in individual branches with a lower PC value.

Figure 5:
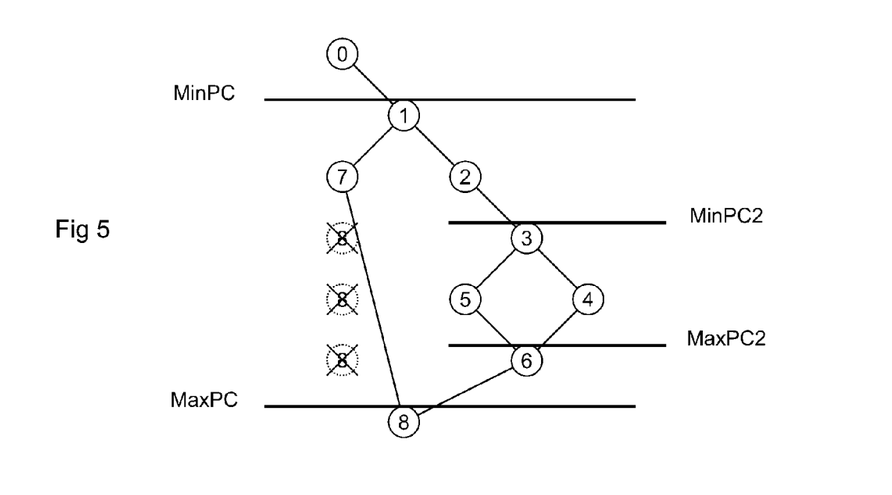
FIG. 5 is a graph illustrating the operation of a branch convergence control mechanism.

FIG. 5 is a graphic representation of the above described convergence point waiting intervals, based on the flow graph of FIG. 4A. Crossed-out circles with instruction 8 show the possible cycles where instruction 8 could have been scheduled for execution if not stalled.

Since the processor system has two independent fetch units, and the warp pool structure is such that any warp can be switched to an active state, i.e. scheduled for execution, without latency (or with hidden latencies), the secondary instruction may alternatively be selected among idle warps in the warp pool when lanes become unused by the primary instruction. This is the "simultaneous warp interweaving" (SWI) alternative.

Of course, the selected idle warp is preferably compatible with the unused lanes, i.e. its execution mask identifies lanes that fit within the lanes not used by the currently scheduled primary instruction. Moreover, the selection of such a compatible warp is simultaneous, so that it can be scheduled together with the current primary instruction without latency.

Figure 6:
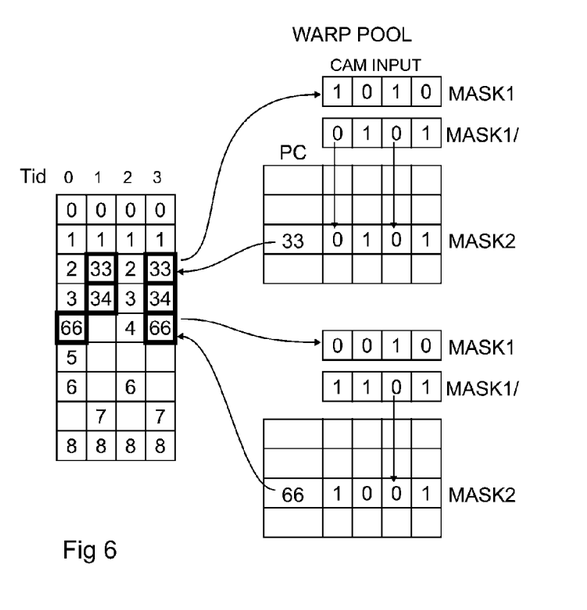
FIG. 6 is a graph illustrating a second optimization possibility offered by the system of FIG. 3.

FIG. 6 is a graph illustrating a solution to achieve this, applied to the pseudo-code example above. The left side of FIG. 6 shows the PC values of the instructions being fetched for each execution lane. It is assumed here that the scheduler does not employ the SBI technique to schedule multiple sub-warps concurrently. Hence the PC values shown in normal squares evolve as shown in FIG. 2B, and correspond to the PC values MPC1 of the primary instruction. Instead, the scheduler attempts to fill unused lanes by scheduling fitting secondary instructions from the warp pool.

When instruction 2, corresponding to the first branch following instruction 1, is scheduled as the primary instruction, lanes 1 and 3 are unused. As shown in bold squares, the scheduler schedules an instruction 33 of a warp found in the warp pool, which happens to use lanes 1 and 3. The next instruction 34 of the same warp is scheduled with primary instruction 3.

When instruction 4 is scheduled as the primary instruction, the lane usage changes: lanes 0, 1 and 3 become unused. The scheduler finds a new warp and schedules its current instruction 66 using lanes 0 and 3. Note that lane 1 remains unused after this choice, probably because the scheduler could not find a better match in the warp pool. The selected warp is nevertheless "compatible" with the primary instruction, because it only uses lanes among the unused lanes of the primary instruction.

In order to instantly find a compatible match in the warp pool, the execution masks of the warps in the pool may be organized as a content addressable memory (CAM), as shown on the right of FIG. 6. The entry to the CAM is the mask (MASK1) of the primary instruction, or its complement (MASK1/). The CAM is configured to return a warp having a mask (MASK2) that is "compatible" with the complement of mask MASK1. The "compatible" mask MASK2 may be equal to complementary mask MASK1/, as shown for the first instruction 33. Mask MASK2 may however also be chosen such that it has any bit value for each "1" of complementary mask MASK1/. As shown for instruction 66, the complementary mask MASK1/ has value "1" for lane 1, while the secondary mask, considered compatible, has value "0" for lane 1. In other words, a secondary mask is considered compatible if it has a "0" for each "0" of the complementary primary mask, regardless of the "1s" of the complementary primary mask.

If there are many warps stored in the warp pool, a full CAM structure may occupy too much area or consume too much power. In that case, a set-associative CAM may be used, and the matching warp is only searched for in the set containing the warp used for the primary instruction. Such set-associative structure can be designed following well-known techniques used in associative caches.

Obviously, both techniques SBI and SWI may be used together. Priority would be given, for instance, to the SBI technique. When that technique does not use the secondary instruction and leaves lanes unused, like lanes 1 and 3 in FIG. 4B when scheduling primary instructions 3 and 6, then the SWI technique may be invoked to fill those lanes.

Although an N-instruction, multiple-data processor structure has been exemplified as a two-instruction, multiple-data structure, the teachings of this disclosure apply to an N-instruction, multiple-data structure by multiplying the number of fetch units and the related hardware for assigning non-intersecting subsets of lanes to the multiple instructions.

What is claimed is:

1. A method for executing instructions on a single-program, multiple-data processor system having a fixed number of execution lanes, the method comprising:
  maintaining a warp pool including a plurality of warps, wherein each warp of the plurality of warps includes:
    a current state of a wave of multiple data being processed,
    a program counter value for fetching a corresponding instruction to execute on the wave, and
    an execution mask identifying a subset of execution lanes assigned to the wave for executing the corresponding instruction;

scheduling a primary instruction for execution from a first warp of the warp pool;
comparing the execution mask of the first warp to the execution masks of the warps in the warp pool;
identifying a second warp in the warp pool, such that the execution mask of the second warp is compatible with a complement of the execution mask of the first warp, and the program counter value of the second warp is distinct from the program counter value of the first warp;
scheduling the instruction of the second warp for execution as a secondary instruction;
fetching the primary and secondary instructions through two respective ports of a dual-port instruction memory, using the program counter values of the first and second warps;
applying the waves of the first and second warps to respective subsets of execution lanes identified by the execution masks of the first and second warps; and
simultaneously executing the primary and secondary instructions in the respective subsets of execution lanes.

2. The method of claim 1, comprising:
scheduling a conditional branch instruction causing execution to proceed in one of two alternate branches with a respective one of two alternate instructions; and
processing the two alternate instructions respectively as the primary and secondary instructions in the respective subsets of execution lanes.

3. The method of claim 2, comprising:
executing instructions of the two alternate branches simultaneously in the respective subsets of execution lanes;
scheduling a branch convergence instruction in a first subset of the respective subsets of execution lanes;
comparing a fetch address of the branch convergence instruction to a fetch address of an instruction scheduled in a second subset of the respective subsets of execution lanes;
stalling the branch convergence instruction while its fetch address is greater than the fetch address of the instruction scheduled in the second subset of the respective subsets of execution lanes, whereby the first subset of the respective subsets of execution lanes becomes free for scheduling an alternate instruction; and
executing the branch convergence instruction when its fetch address is equal to the fetch address of the instruction scheduled in the second subset of the respective subsets of execution lanes.

4. The method of claim 3, wherein the branch convergence instruction is a specific instruction inserted at compile time at a convergence point of a first of the two alternate branches of the conditional branch instruction, wherein the branch convergence instruction is designed to cause a hardware unit to carry out the comparing a fetch address of the branch convergence instruction to a fetch address of an instruction scheduled in a second subset of the respective subsets of execution lanes step and the stalling step.

5. A processor system comprising:
a dual-port instruction memory;
a first instruction fetch unit configured to fetch a primary instruction through a first port of the dual-port instruction memory;
a second instruction fetch unit, distinct from the first instruction fetch unit, configured to fetch a secondary instruction through a second port of the dual-port instruction memory;
a plurality of execution lanes configured to execute the primary instruction in parallel on a wave of multiple data assigned to a primary subset of the execution lanes, and to simultaneously execute the secondary instruction in parallel on a wave of multiple data assigned to a secondary subset of the execution lanes;
a warp pool including a plurality of warps wherein each warp of the plurality of warps includes:
a current state of a corresponding wave of multiple data being processed;
a program counter value for fetching a corresponding instruction to execute on the corresponding wave; and
an execution mask identifying a subset of the execution lanes assigned to the corresponding wave for executing the corresponding instruction;
a content addressable memory storing the execution masks of the warp pool; and
a scheduler circuit configured to schedule the secondary instruction from the warp pool by using a complement of an execution mask of the primary instruction as an input to the content addressable memory, wherein the content addressable memory is designed to identify a match when only the zeroes of the complement of the execution mask of the primary instruction match a mask stored in the content addressable memory.

6. The processor system of claim 5, comprising:
a functional unit configured to execute a branch instruction in parallel in multiple of the execution lanes, and identify a first alternative branch of instructions operating on a first sub-wave of data, and a second alternative branch of instructions operating on a second sub-wave of data;
wherein the scheduler circuit is configured to schedule the primary and secondary instructions respectively from the first and second alternative branches of instructions, and assign the primary and secondary subsets of the execution lanes to the first and second sub-waves.

* * * * *